US012668105B2

(12) United States Patent

Munro et al.

(10) Patent No.: US 12,668,105 B2

(45) Date of Patent: Jun. 30, 2026

(54) VENT REGISTER HAVING MOVABLE SET OF DIFFERENTLY ORIENTED VANES TO REDUCE AIR BLOW FANNING

(71) Applicant: Global IP Holdings, LLC, Sterling Heights, MI (US)

(72) Inventors: Scott Munro, Attica, MI (US); Hyunkyu Kim, LaSalle (CA); Manpreet Sangha, Canton, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 648 days.

(21) Appl. No.: 18/080,233

(22) Filed: Dec. 13, 2022

(65) Prior Publication Data

US 2024/0190218 A1      Jun. 13, 2024

(51) Int. Cl.
B60H 1/34                (2006.01)

(52) U.S. Cl.
CPC ... B60H 1/3421 (2013.01); B60H 2001/3471 (2013.01)

(58) Field of Classification Search
CPC ...................... B60H 1/3421; B60H 2001/3471
USPC ......................................................... 454/155
See application file for complete search history.

(56) References Cited

U.S. PATENT DOCUMENTS

| | | | |
|---|---|---|---|
| 3,938,430 A | 2/1976 | Koppang | |
| 4,664,022 A | 5/1987 | Oddenino | |
| 5,364,303 A | 11/1994 | Terry | |
| 5,470,276 A * | 11/1995 | Burnell | F24F 13/075 |
| | | | 454/319 |
| 5,520,579 A * | 5/1996 | Saida | B60H 1/345 |
| | | | 454/155 |
| 5,690,550 A * | 11/1997 | Mikowski | B60H 1/345 |
| | | | 454/155 |
| 6,059,652 A | 5/2000 | Terry et al. | |
| 6,254,475 B1 | 7/2001 | Danieau et al. | |
| 6,652,371 B2 * | 11/2003 | Kamio | B60H 1/345 |
| | | | 454/155 |
| 6,800,023 B2 * | 10/2004 | Demerath | B60H 1/345 |
| | | | 454/155 |
| 9,878,596 B2 * | 1/2018 | Ross | B60H 1/34 |
| 9,989,275 B2 | 6/2018 | De et al. | |
| 10,239,385 B2 * | 3/2019 | Shibata | B60H 1/345 |
| 10,752,088 B2 * | 8/2020 | Stoia | B60K 35/10 |
| 11,279,206 B1 | 3/2022 | Mueller et al. | |
| 11,358,441 B2 | 6/2022 | Morales et al. | |
| 2003/0220069 A1 | 11/2003 | Orendorff | |
| 2005/0118944 A1 | 6/2005 | Vincent et al. | |
| 2010/0120347 A1 | 5/2010 | Gehring et al. | |
| 2010/0124876 A1 | 5/2010 | Yu et al. | |
| 2014/0302769 A1 | 10/2014 | Sawada | |

(Continued)

*Primary Examiner* — Steven B McAllister
*Assistant Examiner* — Dana K Tighe
(74) *Attorney, Agent, or Firm* — WARNER NORCROSS + JUDD LLP

(57) ABSTRACT

A vent register includes a set of vanes and a mechanical assembly. Each vane is pivotably affixed to a respective stationary point to be rotatable about the stationary point. The mechanical assembly interconnects the vanes so that all of the vanes rotate together in response to one of the vanes being actuated to rotate. At least one of the vanes has an orientation different than at least another one of the vanes such that the at least one of the vanes and the at least another one of the vanes point in different directions as the vanes are rotated.

18 Claims, 14 Drawing Sheets

(56)             References Cited

U.S. PATENT DOCUMENTS

2019/0329630 A1    10/2019  Ren et al.
2022/0082159 A1     3/2022  Bui et al.
2022/0134849 A1*    5/2022  Ahn  .................. B60H 1/00871
                                              454/155

* cited by examiner

VENT REGISTER HAVING MOVABLE SET OF DIFFERENTLY ORIENTED VANES TO REDUCE AIR BLOW FANNING

TECHNICAL FIELD

The present invention relates to a vent register to be used at an air outlet for air blow adjustment.

BACKGROUND

A "register" is an adjustable device, such as an adjustable plate, for widening and narrowing an outlet and regulating a draft. A "vent" is an outlet that allows air to pass out of or into a confined space. As such, a "vent register" is operable for air blow adjustment at an air outlet.

A vent register for HVAC (heating, ventilation, and air conditioning) air blow adjustment of vehicle cabins commonly includes a front set of horizontally extending vanes (louvers or fins) and a rear set of vertically extending vanes. The horizontal vanes are pivotably (i.e., rotatably) movable vertically upward and downward and the vertical vanes are pivotably movable horizontally rightward and leftward. The air blowing direction is adjusted upward/downward by adjusting the vertical positioning of the horizontal vanes and is adjusted rightward/leftward by adjusting the horizontal positioning of the vertical vanes.

A "slim" or "thin" vent register is a vent register for use with a narrow and long (e.g., rectangular-shaped) air outlet. Styling and design considerations often lead to a vehicle incorporating vent registers in the vehicle cabin dashboard to have a high aspect ratio. In other words, those vent registers are wider than they are tall (i.e., the narrow and long air outlet is "slim" or "thin"). Ordinary "slim" vent registers tend to blow a relatively wide air plume.

SUMMARY

A vent register is provided. The vent register includes a set of vanes and a mechanical assembly. Each vane is pivotably affixed to a respective stationary point to be rotatable about the stationary point. The mechanical assembly interconnects the vanes so that all of the vanes rotate together in response to one of the vanes being actuated to rotate. At least one of the vanes has an orientation different than at least another one of the vanes such that the at least one of the vanes and the at least another one of the vanes point in different directions as the vanes are rotated.

The set of vanes may include a first vane, a second vane, and a middle vane positioned between the first vane and the second vane. In this case, either the first vane or the second vane may be the at least one of the vanes and the middle vane is the at least another one of the vanes.

The set of vanes may be vertically extending vanes that move horizontally rightward and leftward when rotated.

The set of vanes may include a pair of end vanes and at least three center vanes, the pair of end vanes including a left end vane and a right end vane, the at least three center vanes including a left center vane, a middle center vane, a right center vane, and the center vanes being positioned between the left end vane and the right end vane. The center vanes have the same orientation and the end vanes each have an orientation different than the orientation of the center vanes such that the center vanes and the end vanes point in different directions as the set of vanes are rotated.

When the set of vanes are in an aiming straight position, the center vanes point straight, the left end vane points rightward toward the center vanes, and the right end vane points leftward toward the center vanes. When the set of vanes are in an aiming rightward position, the center vanes point rightward, the left end vane points more rightward than the center vanes, and the right end vane points either points leftward toward the center vanes or straight or less rightward than the center vanes. When the set of vanes are in an aiming leftward position, the center vanes point leftward, the left end vane either points rightward toward the center vanes or straight or less leftward than the center vanes, and the right end vane points more rightward than the center vanes.

The mechanical assembly may include a linkage, a first gear sub-assembly, and a second gear sub-assembly. The linkage connects the center vanes together so that the center vanes rotate together in response to the middle center vane being actuated to rotate. The first gear sub-assembly connects the left end vane and the left center vane so that the left end vane rotates in response to the left center vane rotating. The second gear sub-assembly connects the right end vane and the right center vane so that the right end vane rotates in response to the right center vane rotating.

The first gear sub-assembly includes first and second spur pinions and first and second spur gears. The first and second spur pinions and the first and second spur gears are pivotably affixed to respective stationary points to be rotatable. The first spur pinion is mounted to the left end vane and the second spur pinion is mounted to the left center vane. The spur gears are in operative arrangement with the spur pinions so that left end vane rotates in response to the left center vane rotating.

The second gear sub-assembly includes third and fourth spur pinions and third and fourth spur gears. The third and fourth spur pinions and the third and fourth spur gears are pivotably affixed to respective stationary points to be rotatable. The third spur pinion is mounted to the right end vane and the fourth spur pinion is mounted to the right center vane. The third and fourth spur gears are in operative arrangement with the third and fourth spur pinions so that right end vane rotates in response to the right center vane rotating.

The mechanical assembly may include an extended linkage having a main link portion, a first end link portion, and a second end link portion. The main link portion connects the center vanes together so that the center vanes rotate together in response to the middle center vane being actuated to rotate. The first end link portion connects the left end vane and the left center vane so that the left end vane rotates in response to the left center vane rotating. The second end link portion connects the right end vane and the right center vane so that the right end vane rotates in response to the right center vane rotating.

A control tab may be attached to the middle center vane. The control tab is actuatable by an operator for the operator to actuate the middle center vane to rotate.

The vanes may be pivotably affixed to the respective stationary points at midpoints along a length of the vanes.

The stationary points to which the center vanes are pivotably affixed may be located along a first lateral line and the stationary points to which the end vanes are pivotably affixed may be located along a different second lateral line.

Another vent register is provided. The vent register includes a set of horizontally extending vanes that are movable vertically upward and leftward and a set of vertically extending vanes that are movable horizontally rightward and leftward. The vent register further includes a mechanical assembly interconnecting the vertically extending vanes so that the vertically extending vanes move horizontally rightward and leftward together. At least one of the vertically extending vanes and another one of the vertically extending vanes point in different directions as the vertically extending vanes move horizontally together.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
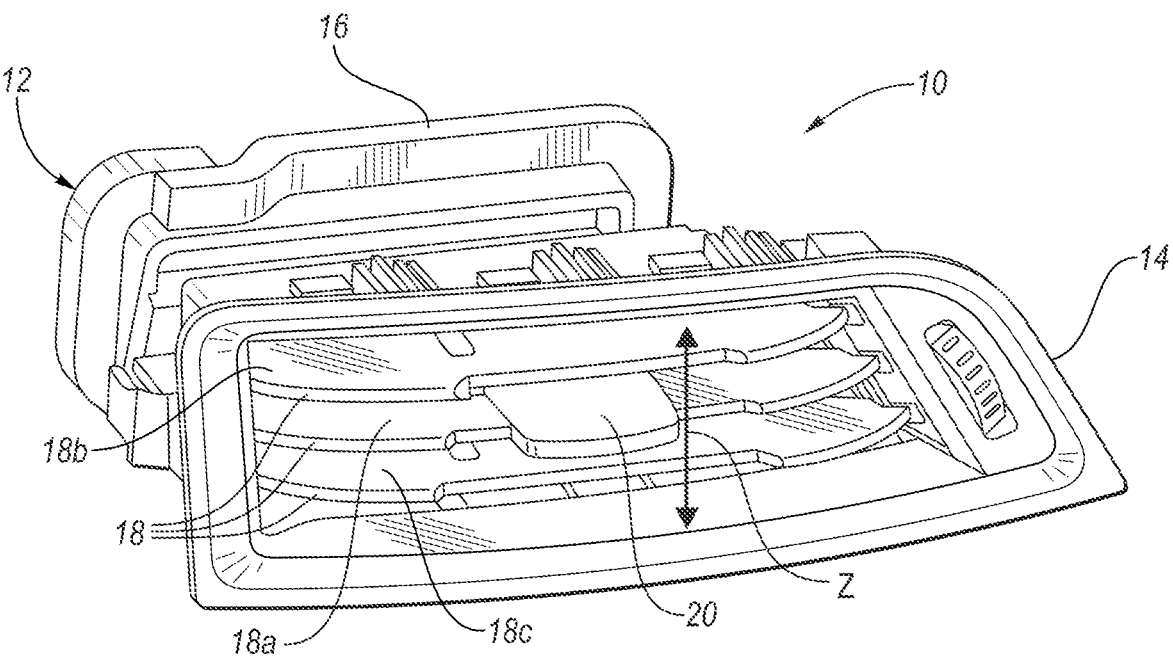
FIG. 1 illustrates a perspective view of a vent register.

Referring now to FIG. 1, a perspective view of a vent register 10 is shown. Vent register 10 includes a housing 12 (not shown in its entirety) having a faceplate 14 and a body 16. Housing 12 is typically configured and dimensioned for insertion into and attachment to a cooperating aperture in a vehicle component such as a dash panel, door trim panel, roof trim panel, center console, etc. Housing 12 is typically positioned at a terminal end (i.e., an air outlet) of a vehicle HVAC duct whereby the duct is in fluid communication with the housing interior such that air from the HVAC passes through the housing and therefrom through faceplate 14 and into the vehicle passenger cabin.

Vent register 10 further includes a set of horizontally extending vanes 18. Horizontal vanes 18 are located at faceplate 14. As such, the set of horizontal vanes 18 is a "front" or "primary" set of vanes. Horizontal vanes 18 are pivotably (i.e., rotatably) movable vertically upward and downward along a vertical "Z"-axis of the vehicle. Horizontal vanes 18 are pivotably adjusted vertically upward/downward to adjust the air blowing direction of vent register 10 upward/downward and thereby direct a flow of air from the HVAC through vent register 10 and into the passenger cabin.

Vent register 10 is a "slim" vent register. Consequently, the set of horizontally extending vanes 18 includes, in this example, only three horizontal vanes. Namely, the set of horizontal vanes 18 includes a primary vane 18a, a top vane 18b, and a bottom vane 18c. As shown in FIG. 1, primary vane 18a is located vertically between top vane 18b and bottom vane 18c; top vane 18b is located vertically above primary vane 18a; and bottom vane 18c is located vertically below primary vane 18a.

Horizontal vanes 18 may be interconnected to be pivotably movable vertically upward and downward together. In this regard, vent register 10 further includes a control tab 20 (e.g., slider knob) carried on primary vane 18a. Control tab 20 may be tilted upward and downward by an operator to pivotably move primary vane 18a upward and downward. Primary vane 18a pivotably moving upward causes top vane 18b and bottom vane 18c to pivotably move upward. Likewise, primary vane 18a pivotably moving downward causes top vane 18b and bottom vane 18c to pivotably move downward. In this way, the air plume blown out through faceplate 14 and into the vehicle passenger cabin may be adjusted along an angle with respect to the vertical Z-axis.

Figure 2:
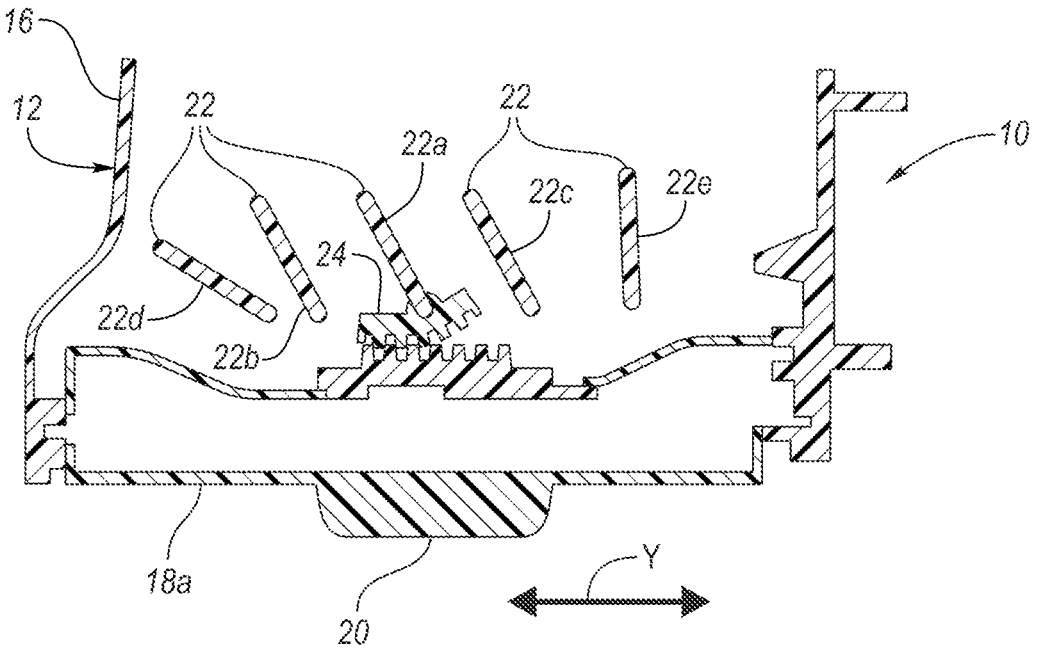
FIG. 2 illustrates a plan sectional view of the vent register showing a movable set of differently oriented, vertically extending vanes ("vertical vanes") of the vent register, the vertical vanes including three centrally positioned vertical vanes that are oriented the same (i.e., angled the same) and left and right end positioned vertical vanes that are oriented differently (i.e., angled differently) than the centrally positioned vertical vanes.

Referring now to FIG. 2, with continual reference to FIG. 1, a plan sectional view of vent register 10 is shown. As shown in FIG. 2, vent register 10 further includes a set of vertically extending vanes 22. Vertical vanes 22 are located within the interior of housing 12. As such, the set of vertical vanes 22 is a "rear" or "secondary" set of vanes. Vertical vanes 22 are pivotably (i.e., rotatably) movable horizontally rightward and leftward along a horizontal "Y"-axis of the vehicle. Vertical vanes 22 are pivotably adjusted horizontally rightward/leftward to adjust the air blowing direction of vent register 10 rightward/leftward and thereby direct the flow of air from the HVAC through vent register 100 and into the passenger cabin.

The set of vertical vanes 22 includes, in this example, five vertical vanes. Namely, the set of vertical vanes 22 includes a middle center vertical vane 22a, a left center vertical vane 22b, a right center vertical vane 22c, a left end vertical vane 22d, and a right end vertical vane 22e. As shown in FIG. 2, middle center vertical vane 22a is located horizontally between left and right center vertical vanes 22b and 22c; left end vertical vane 22d is located horizontally most leftward; and right end vertical vane 22e is located horizontally most rightward. As indicated, vanes 22a, 22b, and 22c are "center" vanes and vanes 22d and 22e are "end" vanes.

Vertical vanes 22 are interconnected by a mechanical assembly (not shown in FIG. 2) to be pivotably movable horizontally rightward and leftward together. In this regard, control tab 20 is connected by a mechanical device such as a gear set 24 or by a slider fork to middle center vertical vane 22a. Control tab 20 may be shifted rightward and leftward by an operator to pivotably move vertical vane 22a horizontally rightward and leftward. Vertical vane 22a (i.e., the "control" vertical vane) pivotably moving rightward/leftward causes, via the mechanical assembly interconnecting vertical vanes 22 to one another, the remaining vertical vanes 22 to correspondingly pivotably move rightward/leftward. Particularly, an operator shifting control tab 20 rightward causes control vane 22a to pivotably move rightward which thereby causes the remaining vertical vanes 22 to correspondingly pivotably move rightward. Conversely, an operator shifting control tab 20 leftward causes control vane 22a to pivotably move leftward which thereby causes the remaining vertical vanes 22 to correspondingly pivotably move leftward. In this way, the air plume blown out through faceplate 14 and into the vehicle passenger cabin may be adjusted along an angle with respect to the horizontal Y-axis.

Vent register 10 may further include other elements that are movable relative to each other to enable an operator to direct the flow of air blown out from the vent register as the operator desires.

In accordance with embodiments, center vanes 22a, 22b, and 22c have the same angular orientation and end vanes 22d and 22e have a different angular orientation than the angular orientation of the center vanes. That is, the angular orientation of end vane 22d is different than the angular orientation of the center vanes and the angular orientation of end vane 22e is different than the angular orientation of the center vanes. Further, the angular orientation of end vane 22e may be the same or different than the angular orientation of end vane 22d. In this way, the set of vertical vanes 22 is a movable set of differently oriented vertical vanes.

As vertical vanes 22 include vertical vanes of different angular orientations which move together, the vertical vanes provide "multi-motion" aiming of the outputted air plume with respect to the horizontal Y-axis. As such, the set of vertical vanes 22 provide multi-motion aiming for "slim" vent register 10 (i.e., "slim outlet").

As noted above, ordinary slim vent registers tend to blow a relatively wide air plume. This is because the vertical vanes of such ordinary slim vent registers have the same angular orientation with one another throughout the horizontal rightward/leftward movement of the vertical vanes. Consequently, ordinary slim vent registers suffer, particularly in down and nominal positions, from the air flow (plume) fanning out. In contrast, the multi-motion vertical vanes 22 of vent register 10 direct the air flow back into a narrow stream. This is because the end vertical vanes have different angular orientations than the center vanes throughout the horizontal rightward/leftward movement of vertical vanes 22 with the angular orientations of the end vertical vanes being designed so that vent register 10 blows a relatively tight air plume throughout the horizontal rightward/leftward movement. In this way, vertical vanes 22 hinder the air from fanning out and instead blow the air as a relatively tight stream of air that can be aimed.

As set forth, ordinary slim vent registers have their end vertical vanes and their center vanes moving together with the same angular orientation as typically this is the most efficient way to aim the air using a mechanical assembly interconnecting the vent registers. Consequently, ordinary slim vent registers (i.e., outlets with a relatively short height and a relatively wide cross car) can lead to a fanning of the air. In contrast, the multi-motion of vertical vanes 22 of vent register 10 has the end vertical vanes moving at a different angle(s) than the center vertical vanes to direct the air into a main air flow (plume). As a result, the air flow of vent register 10 is relatively narrow with reduced fanning. This allows better aiming and longer air flow (plume) at a higher air blow velocity.

Figure 3:
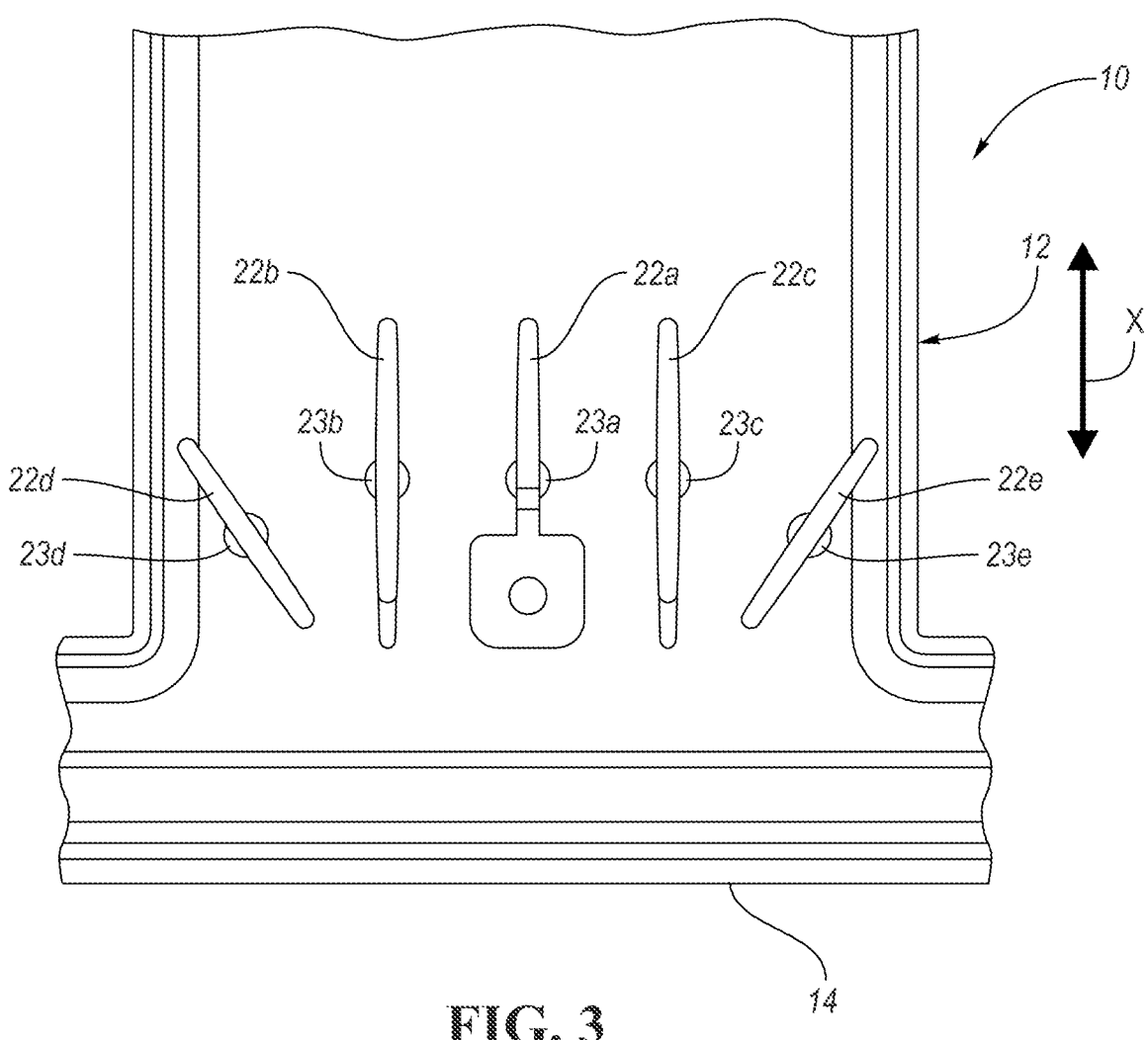
FIG. 3 illustrates a plan cutaway view of the vent register showing the vertical vanes, the vertical vanes being positioned in an aiming straight position, wherein in the aiming straight position the centrally positioned vanes are pointed straight and the left and right end positioned vanes are pointed towards the centrally positioned vanes.

Referring now to FIG. 3, with continual reference to FIG. 2, a plan cutaway view of vent register 10 showing vertical vanes 22 is shown. In FIG. 3, vertical vanes 22 are in an aiming straight position.

Initially, vertical vanes 22 include pivot portions which are pivotably affixed to respective portions of housing 12 (i.e., respective fixed stationary points) to enable the vertical vanes to pivot (i.e., rotate) horizontally rightward and leftward. In this regard, vertical vanes 22a, 22b, 22c, 22d, and 22e include pivot portions 23a, 23b, 23c, 23d, and 23e pivotably affixed to housing 12. Vertical vanes 22a, 22b, 22c, 22d, and 22e are pivotable horizontally rightward and leftward about pivot portions 23a, 23b, 23c, 23d, and 23e, respectively.

Further, pivot portions 23a, 23b, 23c, 23d, and 23e may be located at the midpoint length (e.g., midpoint along the X-axis when pointing straight) of vertical vanes 22a, 22b, 22c, 22d, and 22e. Additionally, the fixed stationary points associated with center vanes 22a, 22b, and 22c are located along a first lateral line and the fixed stationary points associated with end vanes 22d and 22e are located along a different second lateral line with the first lateral line being more rearward in the X-direction than the second lateral line. Such features enable end vanes 22d and 22e to have different orientations than the orientation of center vanes 22a, 22b, and 22c as described herein.

As indicated, vertical vanes 22 are designed with different angular orientations so that the vertical vanes direct a relatively tight air plume. Particularly, relative to the aiming straight position shown in FIG. 3, center vanes 22a, 22b, and 22c are oriented to point straight (i.e., 0°), as is conventionally the case, whereas end vanes 22d and 22d are oriented to point towards the center vanes. That is, as shown in FIG. 3, in the aiming straight position, left end vane 22d is oriented to point (e.g., 20° rightward as roughly shown in FIG. 3)

towards left center vane 22*b* and right end vane 22*e* is oriented to point (e.g., 20° leftward as roughly shown in FIG. 3) towards right center vane 22*c*. As such, in the aiming straight position, center vanes 22*a*, 22*b*, and 22*c* point straight whereas left end vane 22*d* points rightward and right end vane 22*e* points leftward. Consequently, in the aiming straight position, unlike the air flow of an ordinary slim vent register which fans out due to the end vertical vanes being oriented to point straight along with the center vanes, the air flow of vent register 10 does not fan out as end vertical vanes 22*d* and 22*e* do not point straight but instead point towards center vanes 22*a*, 22*b*, and 22*c*.

As indicated, vertical vanes 22 are movable as a group horizontally rightward/leftward. As such, vertical vanes 22 are movable as a group horizontally rightward from the aiming straight position to an aiming rightward position. In such an aiming rightward position (discussed in further detail with respect to FIGS. 6A and 10B), center vanes 22*a*, 22*b*, and 22*c* point rightward (e.g., 25° rightward), left end vane 22*d* points further rightward (e.g., 45° rightward), and right end vane 22*e* either points less leftward or straight or rightward (e.g., 5° rightward). Consequently, in such an aiming rightward position, unlike the air flow of an ordinary slim vent register which fans out due to the end vertical vanes being oriented to point rightward along with the center vanes at the same angular orientation (e.g., all of the vertical vanes of the ordinary slim vent register point 25° rightward), the air flow of vent register 10 does not fan out as end vertical vanes 22*d* and 22*e* do not point rightward along with the center vanes at the same angular orientation but instead left end vertical vane 22*d* points more rightward than center vanes 22*a*, 22*b*, and 22*c* and right end vertical vane 22*e* either points leftwards or straight or less rightward than the center vanes. In this way, end vertical vanes 22*d* and 22*e* have different angular orientations than center vanes 22*a*, 22*b*, and 22*c* throughout the horizontal rightward movement of vertical vanes 22 with the angular orientations of the end vertical vanes being designed so that vent register 10 blows a relatively tight air plume throughout the horizontal rightward movement.

Likewise, vertical vanes 22 are movable as a group horizontally leftward from the aiming straight position to an aiming leftward position. In such an aiming leftward position (discussed in further detail with respect to FIGS. 6B, 6C, and 10C), center vanes 22*a*, 22*b*, and 22*c* point leftward (e.g., 25° leftward), left end vane 22*d* either points less rightward or straight or leftward (e.g., 5° leftward), and right end vane 22*e* points further leftward (e.g., 45° leftward). Consequently, in such an aiming leftward position, unlike the air flow of an ordinary slim vent register which fans out due to the end vertical vanes being oriented to point leftward along with the center vanes at the same angular orientation (e.g., all of the vertical vanes of the ordinary slim vent register point 25° leftward), the air flow of vent register 10 does not fan out as end vertical vanes 22*d* and 22*e* do not point leftward along with the center vanes at the same angular orientation but instead left end vertical vane 22*d* either points less leftward than the center vanes or straight or rightwards and right end vertical vane 22*e* points more leftwards than center vanes 22*a*, 22*b*, and 22*c*. In this way, end vertical vanes 22*d* and 22*e* have different angular orientations than center vanes 22*a*, 22*b*, and 22*c* throughout the horizontal leftward movement of vertical vanes 22 with the angular orientations of the end vertical vanes being designed so that vent register 10 blows a relatively tight air plume throughout the horizontal leftward movement.

Figure 4:
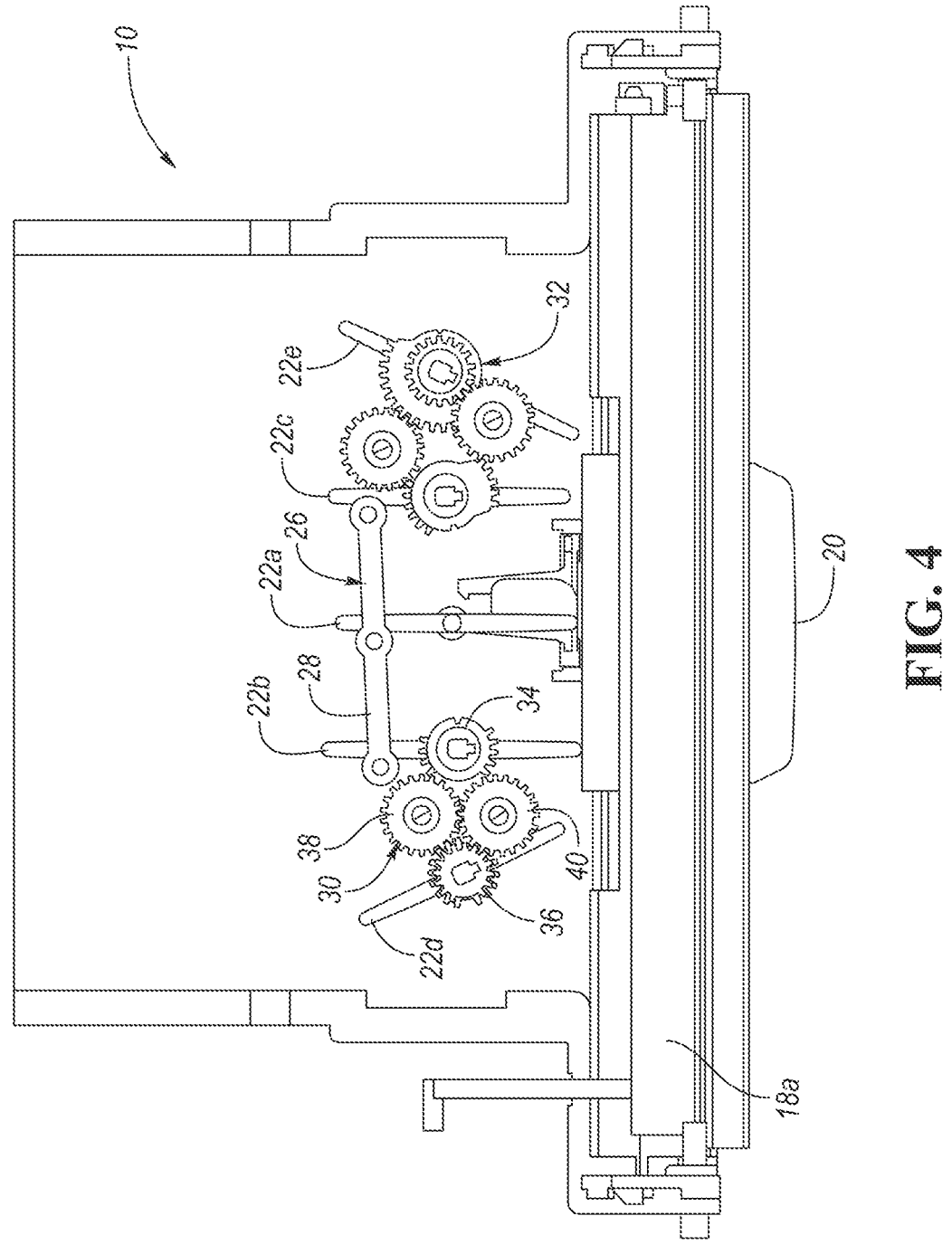
FIG. 4 illustrates a plan sectional view of the vent register showing the vertical vanes and a mechanical assembly interconnecting the vertical vanes so that the vertical vanes are pivotably (i.e., rotatably) movable horizontally rightward and leftward together as a group, the mechanical assembly including a linkage and gear sub-assemblies.

Referring now to FIG. 4, with continual reference to FIGS. 1, 2, and 3, a plan sectional view of vent register 10 is shown. In FIG. 4, vertical vanes 22 are in the aiming straight position.

As shown in FIG. 4, vent register 10 further includes a mechanical assembly 26. Mechanical assembly 26 interconnects vertical vanes 22 so that the vertical vanes are pivotably (i.e., rotatably) movable horizontally rightward and leftward together as a group.

Mechanical assembly 26 employs a spur gear and pinion connector concept. In this regard, mechanical assembly 26 includes a linkage 28, a first gear sub-assembly 30, and a second gear sub-assembly 32. Linkage 28 connects center vanes 22*a*, 22*b*, and 22*c* together so that the center vanes are pivotably movable horizontally rightward and leftward together as a group. Consequently, horizontal rightward/leftward movement of center vane 22*a*, in response to horizontal rightward/leftward actuation of control tab 20 by an operator, causes center vanes 22*b* and 22*c* to move correspondingly horizontally rightward/leftward. First gear sub-assembly 30 connects left end vane 22*d* to left center vane 22*b* so that the left end vane is pivotably movable horizontally rightward and leftward with the left center vane. Consequently, horizontal rightward/leftward movement of left center vane 22*b* causes left end vane 22*d* to move horizontally rightward/leftward. Similarly, second gear sub-assembly 32 connects right end vane 22*e* to right center vane 22*c* so that the right end vane is pivotably movable horizontally rightward and leftward with the right center vane. Consequently, horizontal rightward/leftward movement of right center vane 22*c* causes right end vane 22*e* to move horizontally rightward/leftward.

First gear sub-assembly 30, which connects left end vane 22*d* to left center vane 22*b*, includes a gear arrangement having first and second spur pinions 34 and 36 and first and second spur gears 38 and 40. Spur pinions 34 and 36 and spur gears 38 and 40 are pivotably affixed to housing 12 to enable the spur pinions and the spur gears to rotate about their central axis. Spur pinion 34 is mounted to left center vane 22*b* and spur pinion 36 is mounted to left end vane 22*d*. Spur gears 38 and 40 are in operative arrangement with spur pinions 34 and 36 so that left end vane 22*d* moves horizontally rightward/leftward in response to left center vane 22*b* moving horizontally rightward/leftward.

Similarly, second gear sub-assembly 32 includes a gear arrangement having first and second spur pinions and first and second spur gears (illustrated but not labeled). The spur pinions and the spur gears are pivotably affixed to housing 12 to enable the spur pinions and the spur gears to rotate about their central axis. The spur pinions are mounted to right center vane 22*c* and right end vane 22*e*, respectively. The spur gears are in operative arrangement with the spur pinions so that right end vane 22*e* moves horizontally rightward/leftward in response to right center vane 22*c* moving horizontally rightward/leftward.

Figure 5A:
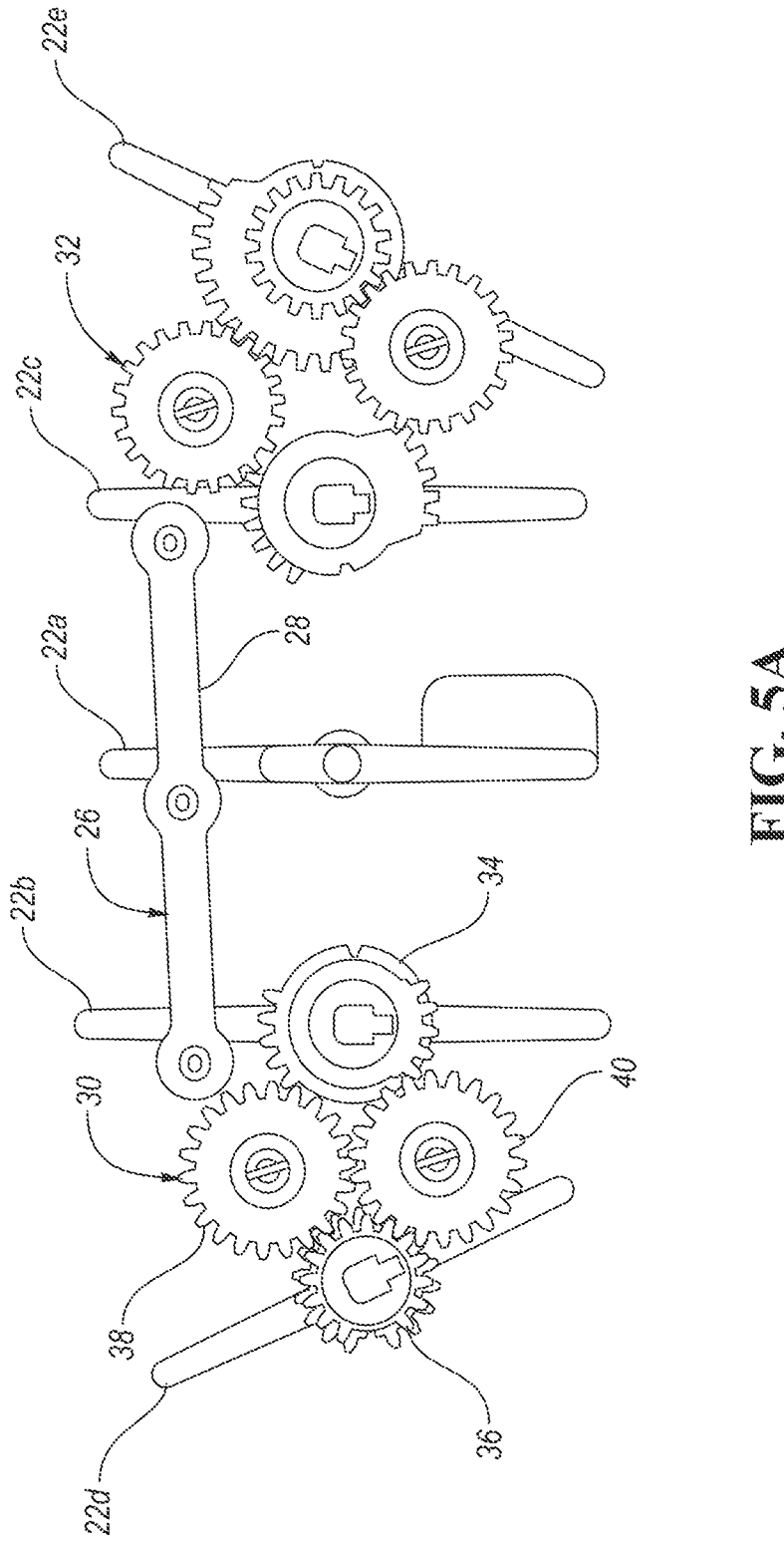
FIG. 5A illustrates a plan view of the vertical vanes, the linkage, and the gear sub-assemblies, the vertical vanes being positioned by the linkage and the gear sub-assemblies in the aiming straight position.
Figure 5B:
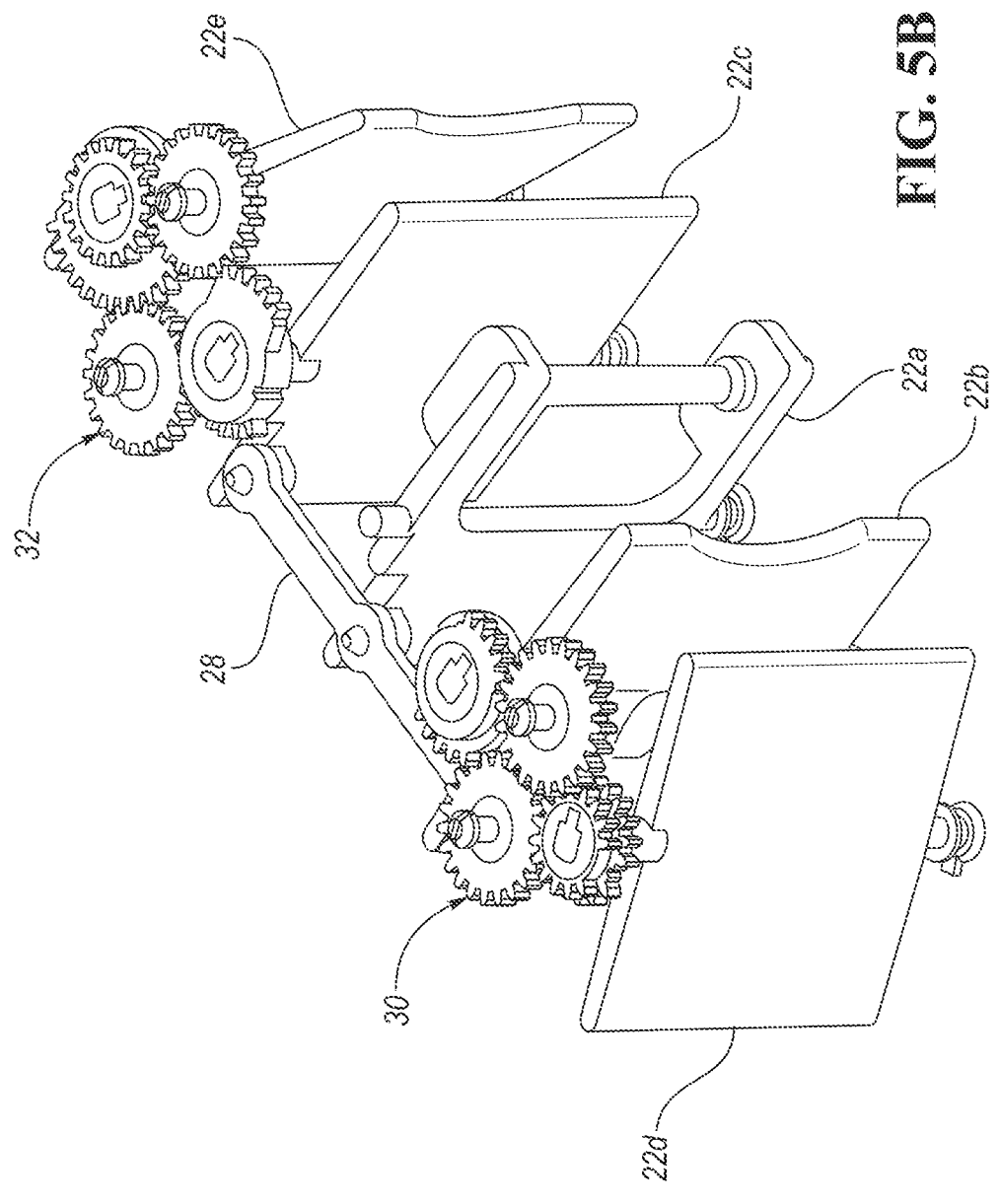
FIG. 5B illustrates a perspective view of the vertical vanes, the linkage, and the gear sub-assemblies, the vertical vanes being positioned by the linkage and the gear sub-assemblies in the aiming straight position.

Referring now to FIGS. 5A and 5B, with continual reference to FIGS. 3 and 4, a plan view and a perspective view, respectively, of vertical vanes 22 and mechanical assembly 26 are shown. In each of FIGS. 5A and 5B, vertical vanes 22 are in the aiming straight position. In this regard, linkage 28, first gear sub-assembly 30, and second gear sub-assembly 32 of mechanical assembly 26 position vertical vanes 22 in the aiming straight position.

Figure 6A:
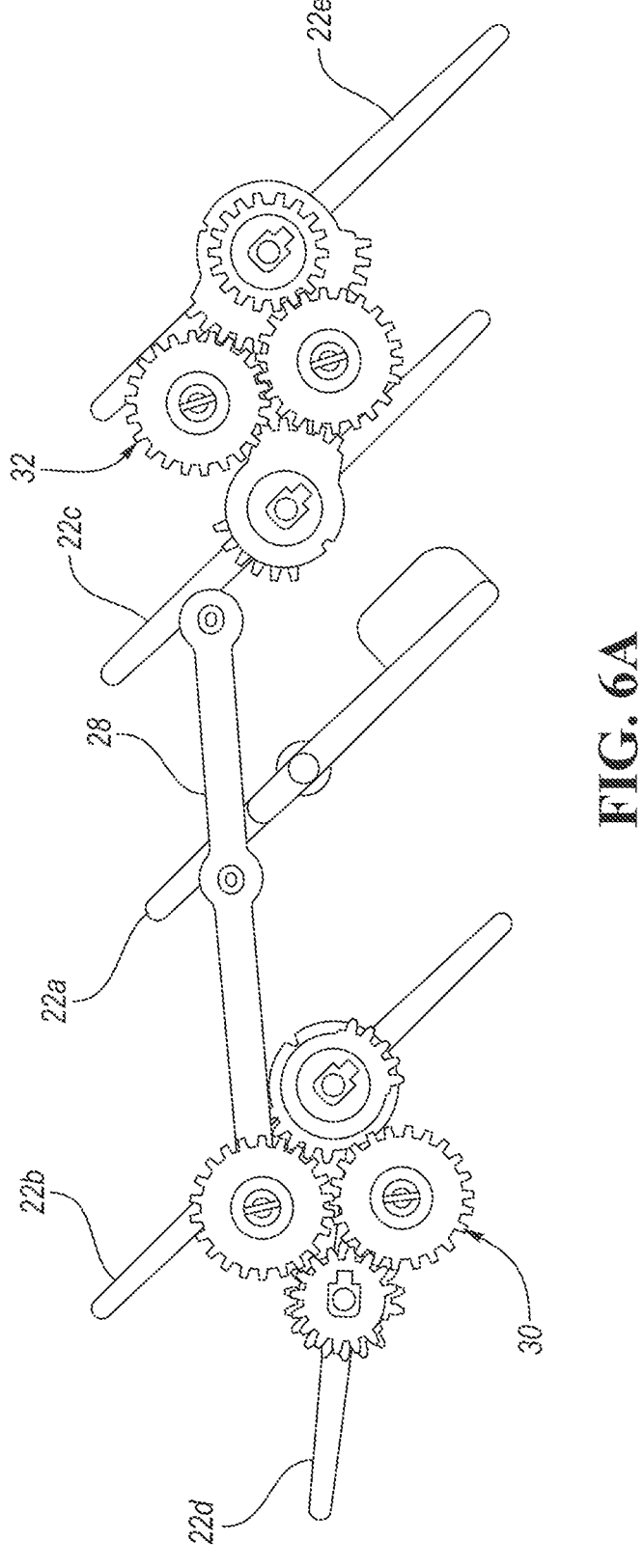
FIG. 6A illustrates a plan view of the vertical vanes, the linkage, and the gear sub-assemblies, the vertical vanes being positioned by the linkage and the gear sub-assemblies in an aiming 45° rightward position.
Figure 6B:
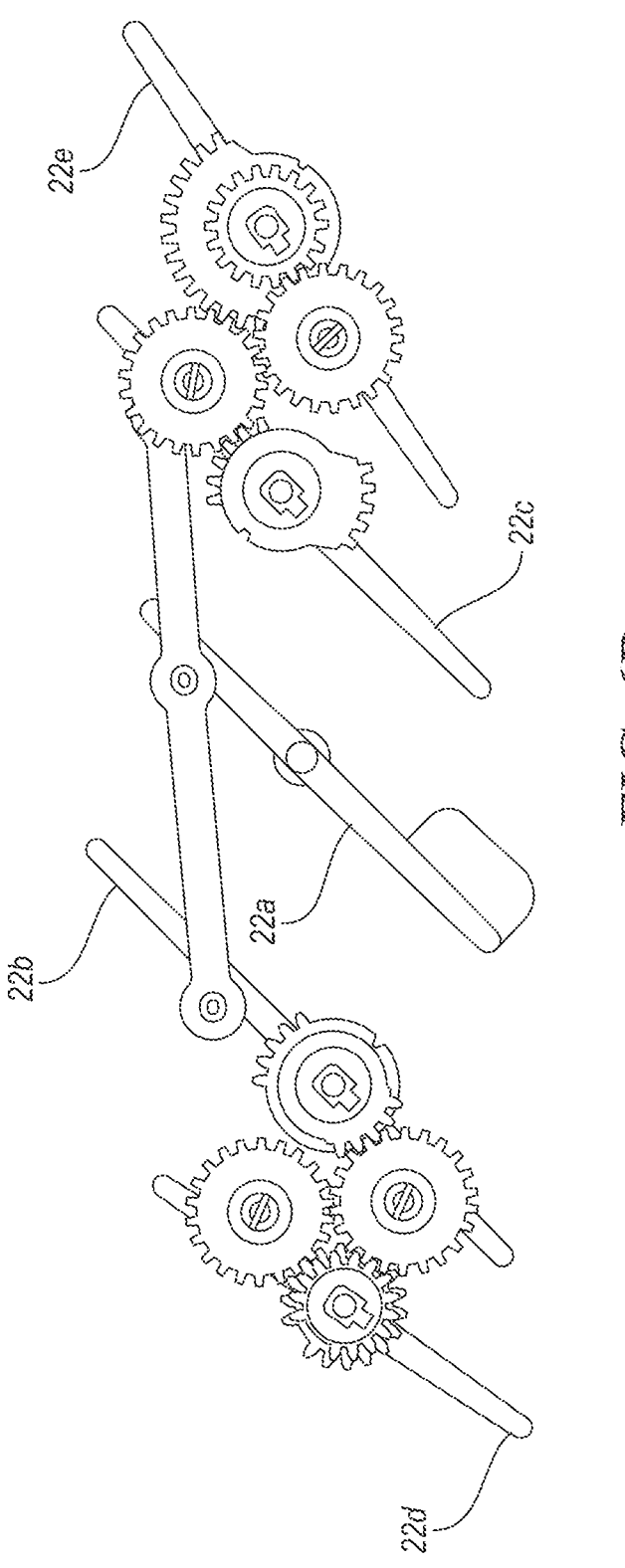
FIG. 6B illustrates a plan view of the vertical vanes, the linkage, and the gear sub-assemblies, the vertical vanes being positioned by the linkage and the gear sub-assemblies in an aiming 45° leftward position.
Figure 6C:
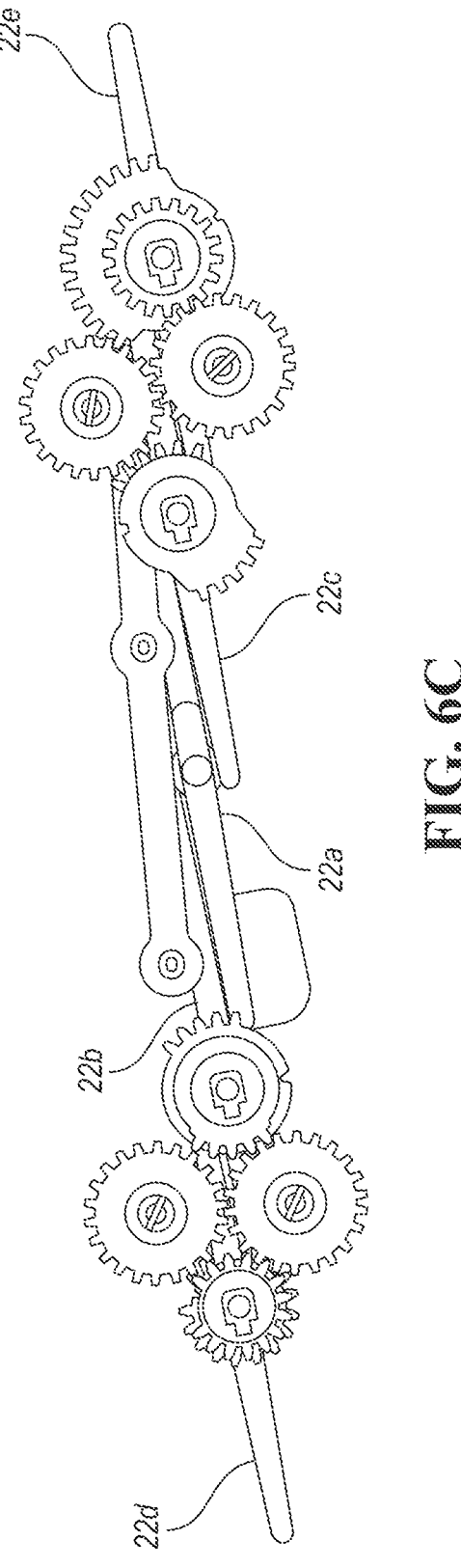
FIG. 6C illustrates a plan view of the vertical vanes, the linkage, and the gear sub-assemblies, the vertical vanes being positioned by the linkage and the gear sub-assemblies in an aiming 80° leftward position, the aiming 80° leftward position being a complete shutoff position for the vent register.

Referring now to FIGS. 6A, 6B, and 6C, with continual reference to FIGS. 3, 4, 5A, and 5B, vertical vanes 22 in aiming positions other than the aiming straight position will be described. Linkage 28, first gear sub-assembly 30, and second gear sub-assembly 32 are shown in each of FIGS. 6A, 6B, and 6C positioning vertical vanes 22 in the aiming positions.

FIG. 6A illustrates a plan view of vertical vanes 22 in an aiming 45° rightward position. As shown in FIG. 6A, in the aiming 45° rightward position, center vanes 22a, 22b, and 22c point 45° rightward, left end vane 22d points rightward to such an extent that left end vane 22 comes at least in close contact with left center vane 22c to seal off air flow between the left end vane and the left center vane (e.g., left end vane 22 is in an almost 90° rightward position), and right end vane 22e points roughly 45° rightward (i.e., right end vane 22e roughly has the same angular orientation as the center vanes when the vertical vanes are in the aiming 45° rightward position).

FIG. 6B illustrates a plan view of vertical vanes 22 in an aiming 45° leftward position. As shown in FIG. 6B, in the aiming 45° leftward position, center vanes 22a, 22b, and 22c point 45° leftward and left end vane 22d and right end vane 22e each point roughly 45° leftward (i.e., left end vane 22d and right end vane 22e roughly have the same angular orientation as the center vanes when the vertical vanes are in the aiming 45° leftward position).

FIG. 6C illustrates a plan view of vertical vanes 22 in an aiming 80° leftward position. As shown in FIG. 6C, in the aiming 80° leftward position, all of vertical vanes 22 point 80° leftward. Consequently, vertical vanes 22 come at least in close contact with one another to completely seal off air flow of vent register 10. In this way, vertical vanes 22 provide shutoff without vent register 10 having to employ the use of a separate shutoff door.

Figure 7A:
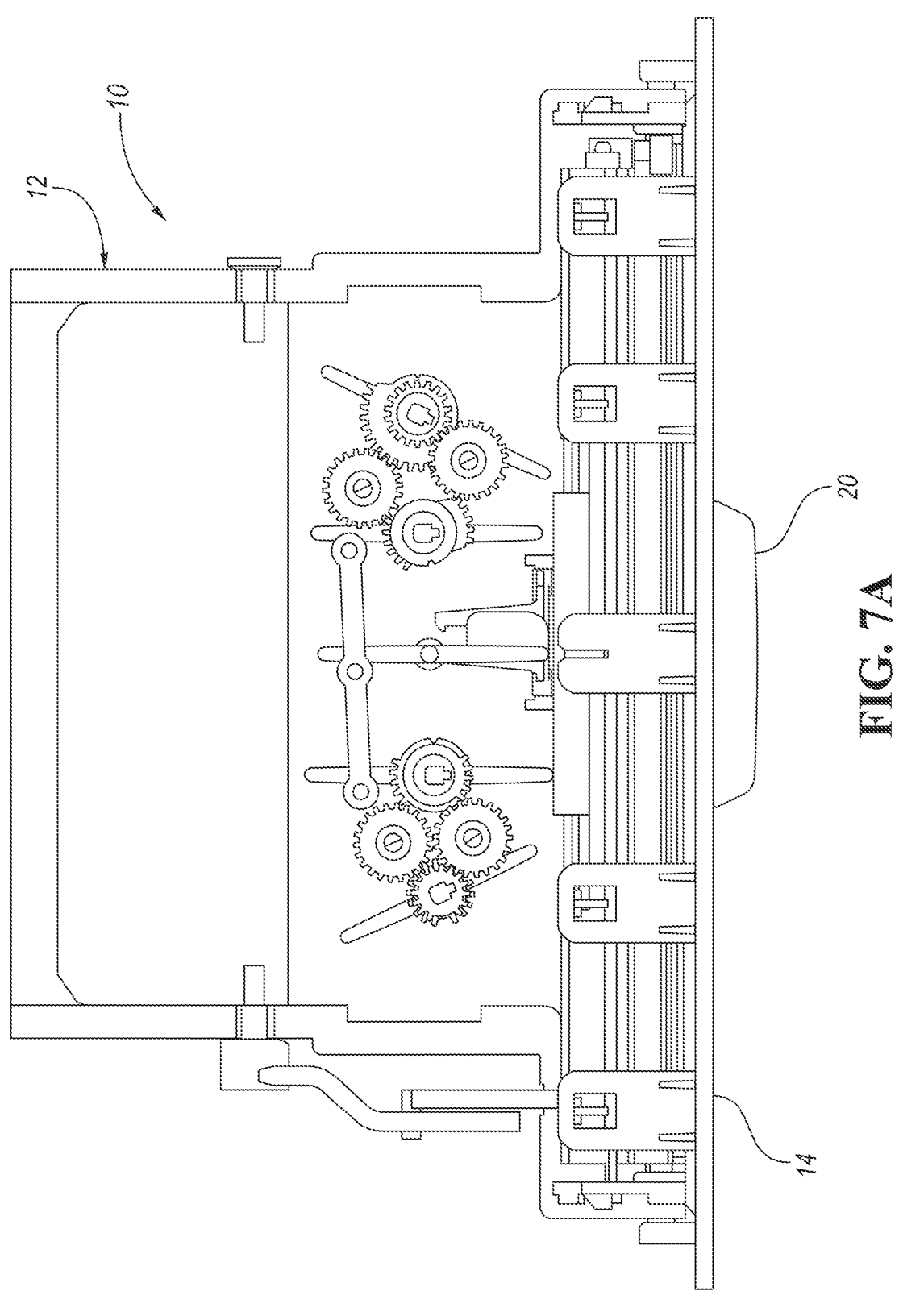
FIG. 7A illustrates a plan cutaway view of the vent register.
Figure 7B:
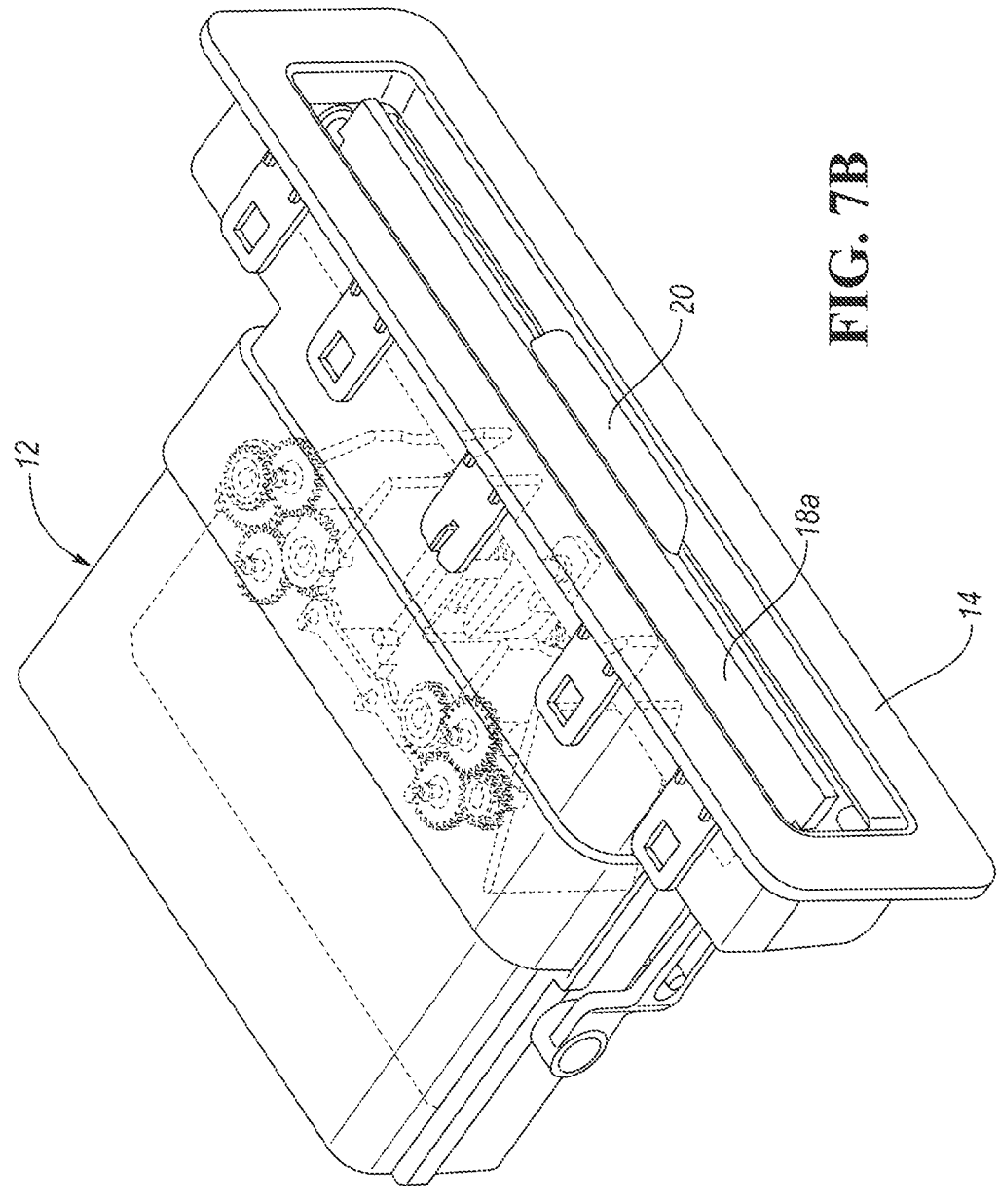
FIG. 7B illustrates an elevated cutaway view of the vent register.
Figure 8:
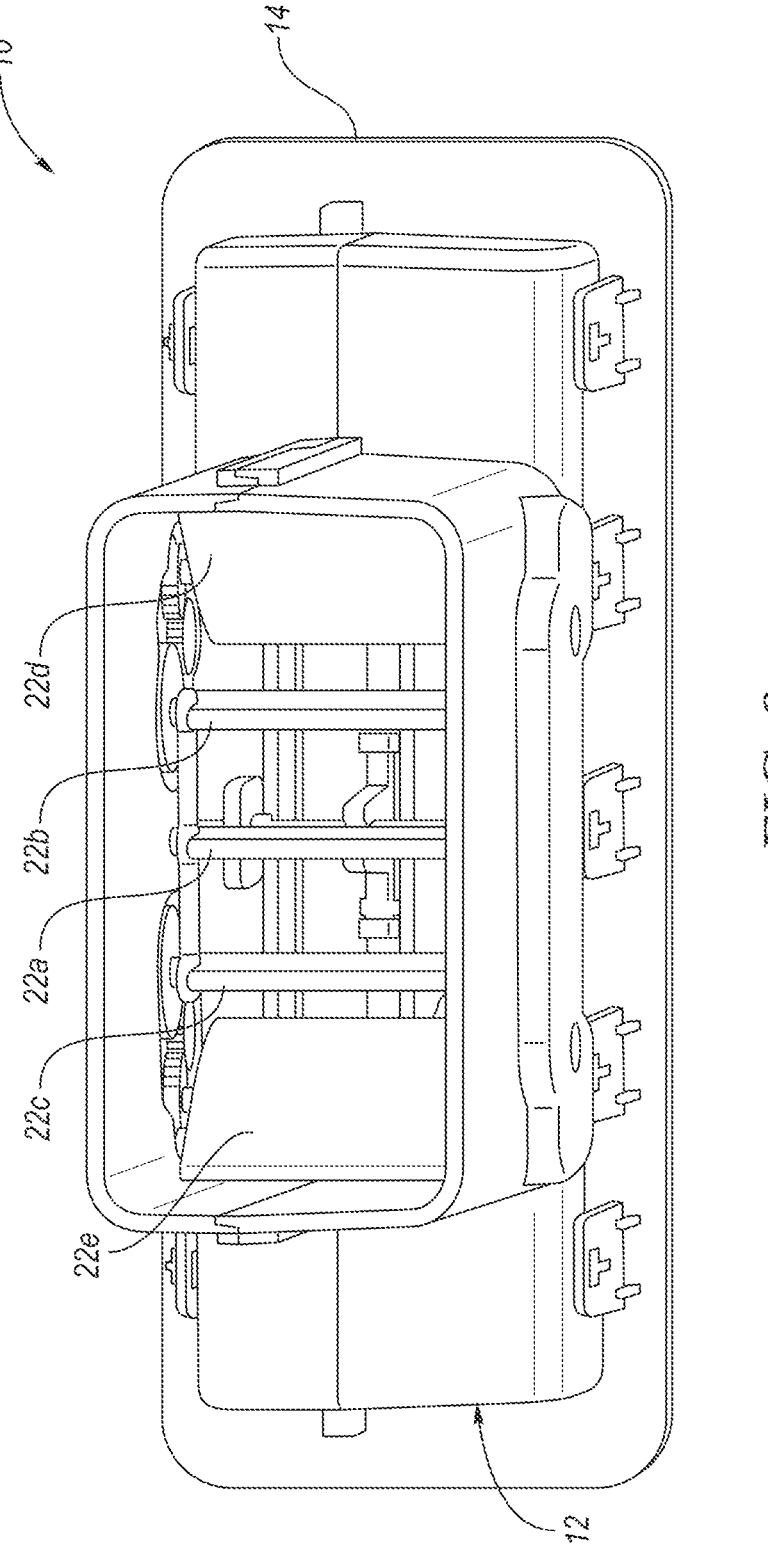
FIG. 8 illustrates a rear view of the vent register.

FIGS. 7A, 7B, and 8 respectively illustrate a plan cutaway view, an elevated cutaway view, and a rear view of vent register 10. In FIGS. 7A, 7B, and 8, vertical vanes 22 are in the aiming straight position.

Figure 9:
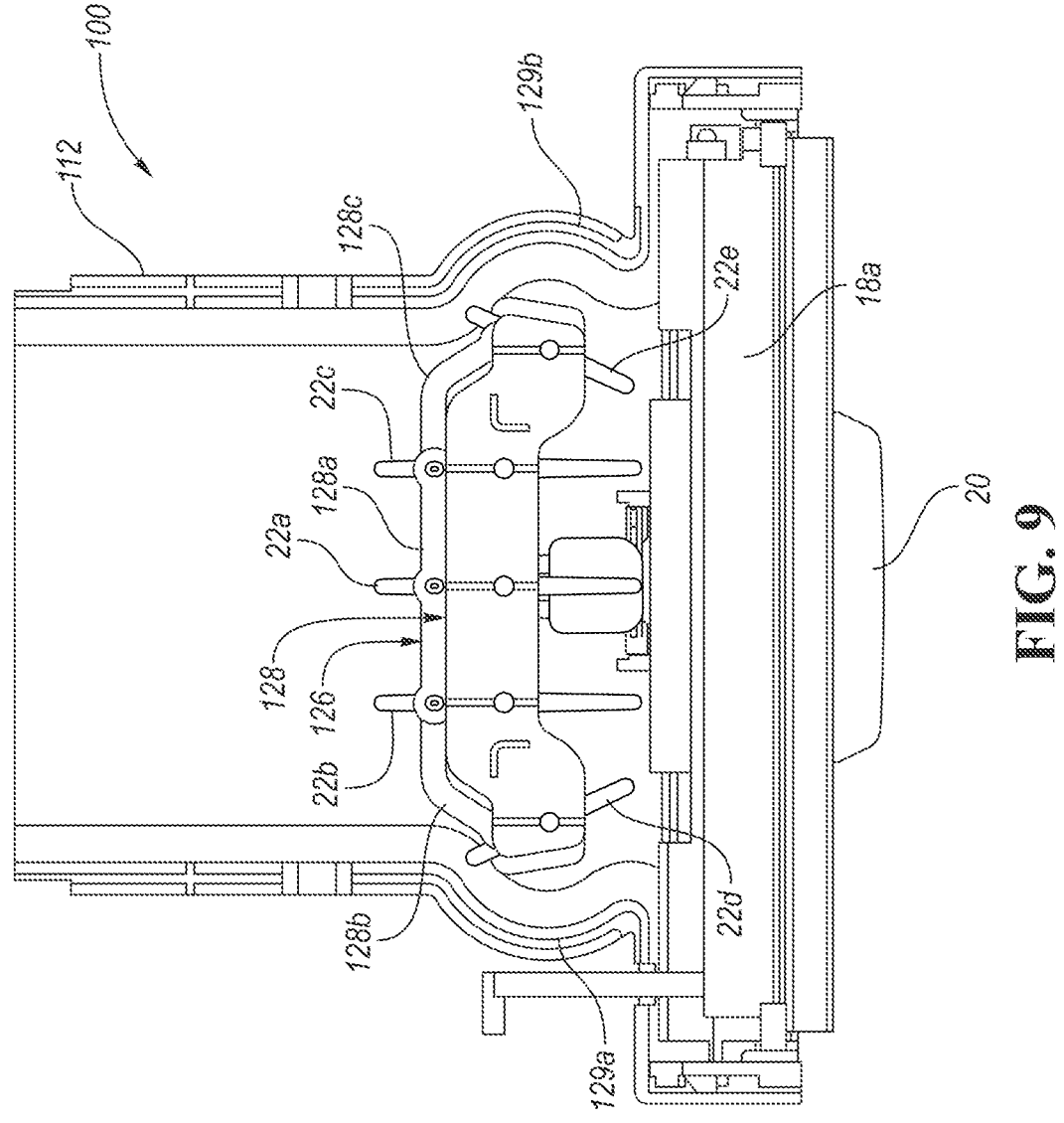
FIG. 9 illustrates a plan cutaway view of another vent register showing the vertical vanes and another type of mechanical assembly interconnecting the vertical vanes so that the vertical vanes are pivotably movable horizontally rightward and leftward together as a group, this mechanical assembly including an extended linkage.

Referring now to FIG. 9, with continual reference to FIG. 2, a plan cutaway view of another vent register 100 is shown. Elements of vent register 100 that are the same or substantially similar as elements of vent register 10 have the same reference numerals. Elements of vent register 100 that correspond to but are different from elements of vent register 100 have the same reference numeral suffix. In FIG. 9, vertical vanes 22 are in the aiming straight position.

Vent register 100 includes a different type of mechanical assembly 126 than mechanical assembly 26 of vent register 10. Like mechanical assembly 26, mechanical assembly 126 interconnects vertical vanes 22 so that the vertical vanes are pivotably movable horizontally rightward and leftward together as a group. Mechanical assembly 126 employs a link connector concept. In this regard, mechanical assembly 126 includes an extended linkage 128.

Extended linkage 128 connects all of vertical vanes 22 together so that all of the vertical vanes are pivotably movable horizontally rightward and leftward together as a group. Extended linkage 128 thus differs from linkage 28 in that extended linkage 128 connects all of vertical vanes 22 together whereas linkage 28 just connects all of center vanes 22a, 22b, and 22c together.

Extended linkage 128 includes a main link portion 128a, a first end link portion 128b, and a second end link portion 128c. Main link portion 128a of extended linkage 128 connects center vanes 22a, 22b, and 22c together so that the center vanes are pivotably movable horizontally rightward and leftward together as a group. Consequently, horizontal rightward/leftward movement of center vane 22a, in response to horizontal rightward/leftward actuation of control tab 20 by an operator, causes center vanes 22b and 22c to move correspondingly horizontally rightward/leftward.

First end link portion 128a connects left center vane 22b to left end vane 22d so that the left end vane is pivotably movable horizontally rightward and leftward with the left center vane. Consequently, horizontal rightward/leftward movement of left center vane 22b causes left end vane 22d to move horizontally rightward/leftward. Similarly, second end link portion 128b connects right center vane 22c to right end vane 22e so that the right end vane is pivotably movable horizontally rightward and leftward with the right center vane. Consequently, horizontal rightward/leftward movement of right center vane 22c causes right end vane 22e to move horizontally rightward/leftward.

Further, housing 112 of vent register 100 differs from housing 12 of vent register 10 in that housing 112 includes first and second bulged housing portions 129a and 129b. Bulged housing portions 129a and 129b for horizontal movement of end link portions 128a and 128b of extended linkage 128 in correspondence with the horizontal rightward/leftward movement of vertical vanes 22 between the aiming 45° leftward position and the aiming 45° rightward position.

Figure 10A:
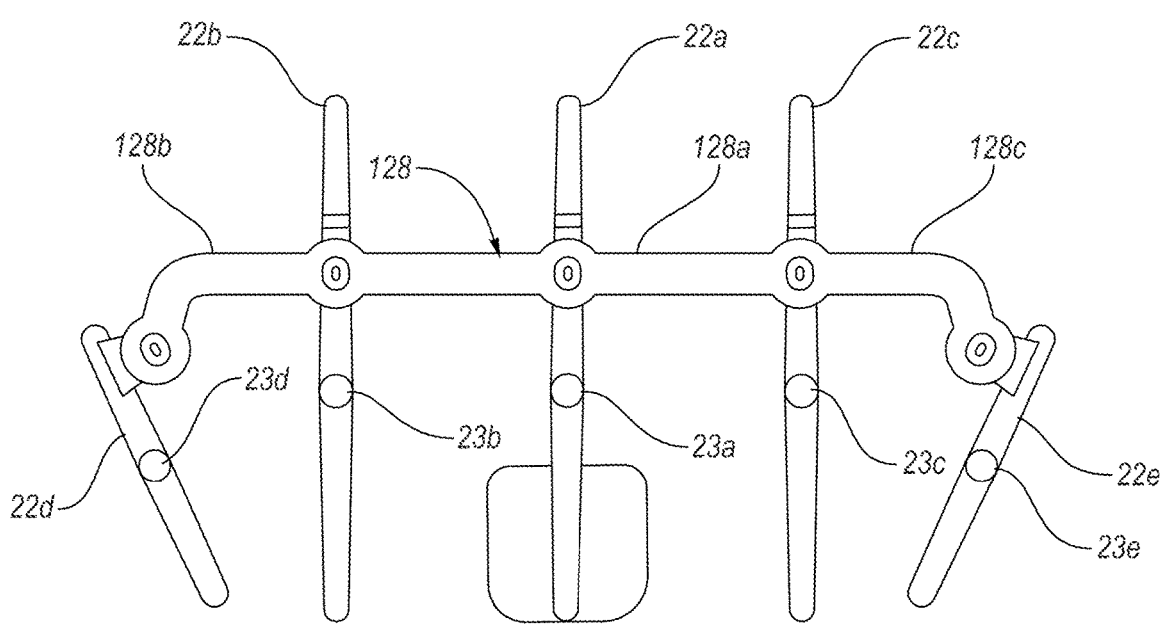
FIG. 10A illustrates a plan view of the vertical vanes and the extended linkage, the vertical vanes being positioned by the extended linkage in the aiming straight position.
Figure 10B:
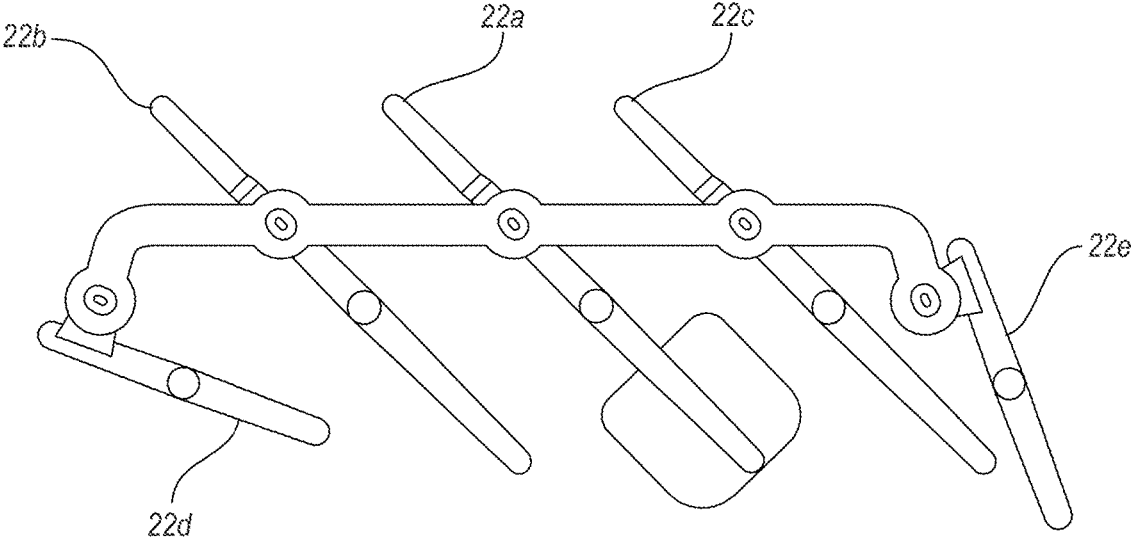
FIG. 10B illustrates a plan view of the vertical vanes and the extended linkage, the vertical vanes being positioned by the extended linkage in the aiming 45° rightward position.
Figure 10C:
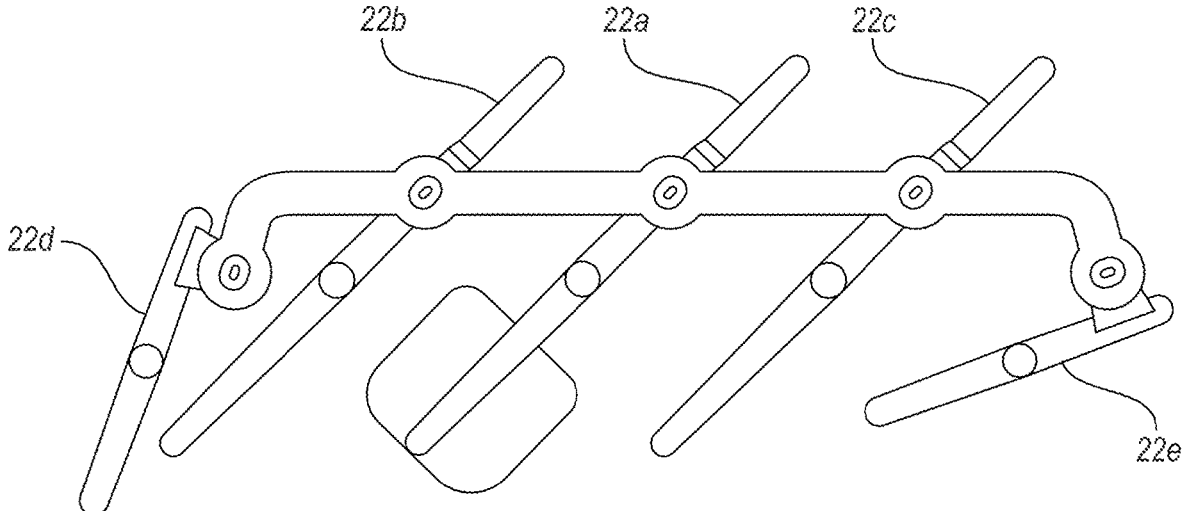
FIG. 10C illustrates a plan view of the vertical vanes and the extended linkage, the vertical vanes being positioned by the extended linkage in the aiming 45° leftward position.

Referring now to FIGS. 10A, 10B, and 10C, plan views of vertical vanes 22 and extended linkage 128 in different aiming positions are shown. Extended linkage 128 is shown in each of FIGS. 10A, 10B, and 10C positioning vertical vanes 22 in the aiming positions.

Notably, as shown in each of FIGS. 10A, 10B, and 10C, end link portions 128b and 128c of extended linkage 128 have a "bent-elbow" configuration whereas main link portion 128a of extended linkage 128 is straight. The bent-elbow configuration accommodates for end vanes 22d and 22e to be oriented differently than the center vanes in conjunction with the different longitudinal placement of the pivot portions 23d and 23e of the end vanes compared with the longitudinal placement of the pivot portions 23a, 23b, and 23c of the center vanes (see, for instance, any of FIGS. 10A, 10B, and 10C).

In FIG. 10A, vertical vanes 22 are positioned by extended linkage 128 in the aiming straight position. In the aiming straight position, center vanes 22a, 22b, and 22c are oriented to point straight (i.e., 0°), as is conventionally the case, whereas end vanes 22d and 22d are oriented to point towards the center vanes. As such, center vanes 22a, 22b, and 22c point straight whereas left end vane 22d points rightward and right end vane 22e points leftward. Consequently, in the aiming straight position, unlike the air flow of an ordinary slim vent register which fans out due to the end vertical vanes being oriented to point straight along with the center vanes, the air flow of vent register 10 does not fan out as end vertical vanes 22d and 22e do not point straight but instead point towards center vanes 22a, 22b, and 22c.

In FIG. 10B, vertical vanes 22 are positioned by extended linkage 128 in the aiming 45° rightward position. In the aiming 45° rightward position, center vanes 22a, 22b, and 22c are oriented to point 45° rightward, as is conventionally the case, whereas left end vane 22d is oriented to point more than 45° rightward toward the center vanes and right end vane 22e is oriented to point less than 45° rightward away from the center vanes. Consequently, in the aiming 45° rightward position, unlike the air flow of an ordinary slim vent register which fans out due to the end vertical vanes having the same orientation as the center vanes (e.g., all of the vertical vanes of the ordinary slim vent register point 45° rightward in the aiming 45° rightward position), the air flow of vent register 100 does not fan out as end vertical vanes 22d and 22e do not have the same orientation as the center vanes but instead left end vertical vane 22d points more rightward than the center vanes and right end vertical vane 22e points less rightward than the center vanes.

In FIG. 10C, vertical vanes 22 are positioned by extended linkage 128 in the aiming 45° leftward position. In the aiming 45° leftward position, center vanes 22a, 22b, and 22c are oriented to point 45° leftward, as is conventionally the case, whereas left end vane 22d is oriented to point less than 45° leftward away from the center vanes and right end vane 22e is oriented to point more than 45° leftward toward the center vanes. Consequently, in the aiming 45° leftward position, unlike the air flow of an ordinary slim vent register which fans out due to the end vertical vanes having the same orientation as the center vanes (e.g., all of the vertical vanes of the ordinary slim vent register point 45° leftward in the aiming 45° leftward position), the air flow of vent register 100 does not fan out as end vertical vanes 22d and 22e do not have the same orientation as the center vanes but instead left end vertical vane 22d points less leftward than the center vanes and right end vertical vane 22e points more leftward than the center vanes.

As described, a vent register in accordance with embodiments of the present invention includes a movable set of differently oriented vanes to reduce air blow fanning. The vent register may be for vehicle applications as well as for residential applications. The vent register is intended to overcome problems unresolved by previous technology which include air blow fanning due to the vanes having the same orientation.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A vent register comprising:
a set of vanes including a pair of end vanes and at least three center vanes, the pair of end vanes including a left end vane and a right end vane, the at least three center vanes including a left center vane, a middle center vane, a right center vane, each vane being pivotally affixed to a respective stationary point to be rotatable about the respective stationary point; and
a mechanical assembly interconnecting the vanes so that all of the vanes rotate together in response to one of the vanes being actuated to rotate; and
wherein the at least three center vanes have the same orientation and the pair of end vanes each have an orientation different than the orientation of one another and the pair of end vanes each have an orientation different than the at least three center vanes such that the at least three center vanes and the pair of end vanes point in different directions as the set of vanes are rotated.

2. The vent register of claim 1 wherein:
the set of vanes includes a first vane, a second vane, and a middle vane positioned between the first vane and the second vane.

3. The vent register of claim 2 wherein:
the first vane is the at least one of the vanes and the middle vane is the at least another one of the vanes.

4. The vent register of claim 1 wherein:
the set of vanes are vertically extending vanes that move horizontally rightward and leftward when rotated.

5. The vent register of claim 1 wherein:
when the set of vanes are in an aiming straight position, the at least three center vanes point straight, the left end vane points rightward toward the at least three center vanes, and the right end vane points leftward toward the at least three center vanes.

6. The vent register of claim 1 wherein:
when the set of vanes are in an aiming rightward position, the at least three center vanes point rightward, the left end vane points more rightward than the at least three center vanes, and the right end vane points either points leftward toward the at least three center vanes or straight or less rightward than the at least three center vanes.

7. The vent register of claim 1 wherein:
when the set of vanes are in an aiming leftward position, the at least three center vanes point leftward, the left end vane either points rightward toward the at least three center vanes or straight or less leftward than the at least three center vanes, and the right end vane points more rightward than the at least three center vanes.

8. The vent register of claim 1 wherein:
the mechanical assembly includes a linkage, a first gear sub-assembly, and a second gear sub-assembly, the linkage connecting the at least three center vanes together so that the at least three center vanes rotate together in response to the middle center vane being actuated to rotate, the first gear sub-assembly connecting the left end vane and the left center vane so that the left end vane rotates in response to the left center vane rotating, and the second gear sub-assembly connecting the right end vane and the right center vane so that the right end vane rotates in response to the right center vane rotating.

9. The vent register of claim 8 wherein:
the first gear sub-assembly includes first and second spur pinions and first and second spur gears, the first and second spur pinions and the first and second spur gears being pivotably affixed to respective stationary points to be rotatable, the first spur pinion being mounted to the left end vane and the second spur pinion being mounted to the left center vane, and the first and second spur gears being in operative arrangement with the first and second spur pinions so that left end vane rotates in response to the left center vane rotating.

10. The vent register of claim 9 wherein:
the second gear sub-assembly includes third and fourth spur pinions and third and fourth spur gears, the third and fourth spur pinions and the third and fourth spur gears being pivotably affixed to respective stationary points to be rotatable, the third spur pinion being mounted to the right end vane and the fourth spur pinion being mounted to the right center vane, and the third and fourth spur gears being in operative arrangement with the third and fourth spur pinions so that right end vane rotates in response to the right center vane rotating.

11. The vent register of claim 1 wherein:
the mechanical assembly includes an extended linkage, the extended linkage having a main link portion, a first end link portion, and a second end link portion, the main link portion connecting the at least three center vanes together so that the at least three center vanes rotate together in response to the middle center vane being actuated to rotate, the first end link portion connecting the left end vane and the left center vane so that the left end vane rotates in response to the left center vane rotating, and the second end link portion connecting the right end vane and the right center vane so that the right end vane rotates in response to the right center vane rotating.

12. The vent register of claim 1 further comprising: a control tab attached to the middle center vane; and the control tab being actuatable by an operator for the operator to actuate the middle center vane to rotate.

13. The vent register of claim 1 wherein: the set of vanes are pivotably affixed to the respective stationary points at midpoints along a length of the vanes.

14. The vent register of claim 1 wherein: the stationary points to which the at least three center vanes are pivotably affixed are located along a first lateral line and the stationary points to which the end vanes are pivotably affixed are located along a different second lateral line.

15. A vent register comprising: a set of horizontally extending vanes that are movable vertically upward and leftward; a set of vertically extending vanes including a pair of end vanes and at least three center vanes, the pair of end vanes including a left end vane and a right end vane, the at least three center vanes including a left center vane, a middle center vane, a right center vane, the at least three center vanes being positioned horizontally between the left end vane and the right end vane, wherein the at least three center vanes point in the same direction and the end vanes point in different directions than the at least three center vanes as the at least three center vanes and the end vanes move horizontally together, the set of vertically extending vanes movable horizontally rightward and leftward; and a mechanical assembly interconnecting the vertically extending vanes so that the vertically extending vanes move horizontally rightward and leftward together; and wherein when the set of vertically extending vanes are in an aiming straight position, the at least three center vanes point straight, the left end vane points rightward toward the center vanes, and the right end vane points leftward toward the at least three center vanes.

16. The vent register of claim 15 wherein: the mechanical assembly includes a linkage, a first gear sub-assembly, and a second gear sub-assembly, the linkage connecting the at least three center vanes together so that the at least three center vanes move horizontally together in response to the middle center vane being actuated to move horizontally, the first gear sub-assembly connecting the left end vane and the left center vane so that the left end vane moves horizontally in response to the left center vane moving horizontally, and the second gear sub-assembly connecting the right end vane and the right center vane so that the right end vane moves horizontally to the right center vane moving horizontally.

17. The vent register of claim 15 wherein: the mechanical assembly includes an extended linkage, the extended linkage having a main link portion, a first end link portion, and a second end link portion, the main link portion connecting the at least three center vanes together so that the at least three center vanes so that the at least three center vanes move horizontally together in response to the middle center vane being actuated to move horizontally, the first end link portion connecting the left end vane and the left center vane so that the left end vane moves horizontally in response to the left center vane moving horizontally, and the second end link portion connecting the right end vane and the right center vane so that the right end vane moves horizontally in response to the right center vane moving horizontally.

18. A vent register comprising: a set of vanes including a pair of end vanes and at least three center vanes, the pair of end vanes including a left end vane and a right end vane, the at least three center vanes including a left center vane, a middle center vane, a right center vane, each vane being pivotably affixed to a respective stationary point to be rotatable about the stationary point; and a mechanical assembly interconnecting the vanes so that all of the vanes rotate together in response to one of the vanes being actuated to rotate; wherein the at least three center vanes have the same orientation and the end vanes each have an orientation different than the orientation of the at least three center vanes such that the at least three center vanes and the pair of end vanes point in different directions as the set of vanes are rotated; and wherein:
(1) when the set of vanes are in an aiming straight position, the at least three center vanes point straight, the left end vane points rightward toward the at least three center vanes, and the right end vane points leftward toward the at least three center vanes;
(2) when the set of vanes are in an aiming rightward position, the at least three center vanes point rightward, the left end vane points more rightward than the at least three center vanes, and the right end vane points either points leftward toward the at least three center vanes or straight or less rightward than the at least three center vanes; or
(3) when the set of vanes are in an aiming leftward position, the at least three center vanes point leftward, the left end vane either points rightward toward the at least three center vanes or straight or less leftward than the at least three center vanes, and the right end vane points more rightward than the at least three center vanes.

* * * * *